United States Patent
Krummen et al.

(10) Patent No.: US 12,526,434 B2
(45) Date of Patent: Jan. 13, 2026

(54) ENCODING ELECTROCARDIOGRAPHIC DATA

(71) Applicant: The Vektor Group, Inc., San Diego, CA (US)

(72) Inventors: Robert Joseph Krummen, Bellevue, WA (US); Christopher J. T. Villongco, Roswell, GA (US); Alexander Michael Monko, Carlsbad, CA (US)

(73) Assignee: The Vektor Group, Inc., San Diego, CA (US)

( * ) Notice: Subject to any disclaimer, the term of this patent is extended or adjusted under 35 U.S.C. 154(b) by 677 days.

(21) Appl. No.: 17/865,249

(22) Filed: Jul. 14, 2022

(65) Prior Publication Data
US 2023/0388520 A1     Nov. 30, 2023

Related U.S. Application Data

(60) Provisional application No. 63/346,500, filed on May 27, 2022.

(51) Int. Cl.
*G06T 7/00*       (2017.01)
*G06V 30/10*       (2022.01)
(Continued)

(52) U.S. Cl.
CPC ......... *H04N 19/172* (2014.11); *G06T 7/0012* (2013.01); *G06V 30/10* (2022.01); *H04N 19/597* (2014.11)

(58) Field of Classification Search
None
See application file for complete search history.

(56) References Cited

U.S. PATENT DOCUMENTS

| | | |
|---|---|---|
| 4,352,163 A | 9/1982 | Schultz et al. |
| 5,458,116 A | 10/1995 | Egler |

(Continued)

FOREIGN PATENT DOCUMENTS

| | | |
|---|---|---|
| CN | 105263405 A | 1/2016 |
| CN | 106725428 | 5/2017 |

(Continued)

OTHER PUBLICATIONS

Baydoun, Mohammed, et al. "High precision digitization of paper-based ECG records: a step toward machine learning." IEEE journal of translational engineering in health and medicine 7 (2019): 1-8. (Year: 2019).*

(Continued)

*Primary Examiner* — Sean M Conner
(74) *Attorney, Agent, or Firm* — Perkins Coie LLP

(57) ABSTRACT

A system for generating an encoding of a lead of electrocardiogram (ECG) represented as an ECG image. The system identifies a reference pulse of the ECG image having a reference width pixel count, a reference height pixel count, a reference time, and a reference voltage. The system identifies a baseline pixel-row of a plotline of the ECG image that contains a graph of the lead. The system encodes per-pixel timing information based on the reference time and the reference width pixel count. The system, for a plurality of pixel-columns, identifies a voltage pixel-row of that pixel-column that has an ECG value of the graph and encodes a voltage based on distance between the baseline pixel-row and the voltage pixel-row and based on the reference voltage and the reference height pixel count.

15 Claims, 12 Drawing Sheets

(51) Int. Cl.
  *H04N 19/172* (2014.01)
  *H04N 19/597* (2014.01)

(56) References Cited

U.S. PATENT DOCUMENTS

| | | |
|---|---|---|
| 5,596,634 A | 1/1997 | Fernandez et al. |
| 5,601,084 A | 2/1997 | Sheehan |
| 5,803,084 A | 9/1998 | Olson |
| 5,891,132 A | 4/1999 | Hohla |
| 6,269,336 B1 | 7/2001 | Ladd et al. |
| 6,292,783 B1 | 9/2001 | Rohler et al. |
| 6,324,513 B1 | 11/2001 | Nagai et al. |
| 6,370,412 B1 | 4/2002 | Armoundas et al. |
| 6,567,805 B1 | 5/2003 | Johnson et al. |
| 6,895,084 B1 | 5/2005 | Saylor et al. |
| 6,931,273 B2 | 8/2005 | Groenewegen et al. |
| 7,010,347 B2 | 3/2006 | Schecter |
| 7,286,866 B2 | 10/2007 | Okerlund et al. |
| 7,424,137 B2 | 9/2008 | Badilini et al. |
| 8,224,640 B2 | 7/2012 | Sharma et al. |
| 8,521,266 B2 | 8/2013 | Narayan |
| 8,838,203 B2 | 9/2014 | Van Dam et al. |
| 8,849,389 B2 | 9/2014 | Anderson et al. |
| 9,014,795 B1 | 4/2015 | Yang |
| 9,129,053 B2 | 9/2015 | Mansi et al. |
| 9,277,970 B2 | 3/2016 | Mansi et al. |
| 9,320,126 B2 | 4/2016 | Valcore, Jr. |
| 9,706,935 B2 | 7/2017 | Spector |
| 9,842,725 B2 | 12/2017 | Valcore, Jr. |
| 9,948,642 B2 | 4/2018 | Wang |
| 10,039,454 B2 | 8/2018 | Sapp, Jr. et al. |
| 10,311,978 B2 | 6/2019 | Mansi et al. |
| 10,319,144 B2 | 6/2019 | Krummen et al. |
| 10,342,620 B2 | 7/2019 | Kiraly et al. |
| 10,363,100 B2 | 7/2019 | Trayanova et al. |
| 10,556,113 B2 | 2/2020 | Villongco |
| 10,617,314 B1 | 4/2020 | Villongco |
| 10,713,790 B2 | 7/2020 | Adler |
| 10,860,754 B2 | 12/2020 | Villongco |
| 10,861,246 B2 | 12/2020 | Voth |
| 10,952,794 B2 | 3/2021 | Villongco |
| 10,998,101 B1 | 5/2021 | Tran |
| 11,065,060 B2 | 7/2021 | Villongco |
| 11,259,871 B2 | 3/2022 | Villongco |
| 2001/0049688 A1 | 12/2001 | Fratkina et al. |
| 2002/0010679 A1 | 1/2002 | Felsher |
| 2002/0154153 A1 | 10/2002 | Messinger |
| 2002/0188599 A1 | 12/2002 | Mcgreevy |
| 2003/0182124 A1 | 9/2003 | Khan |
| 2004/0059237 A1 | 3/2004 | Narayan |
| 2004/0083092 A1 | 4/2004 | Valles |
| 2004/0176697 A1 | 9/2004 | Kappenberger |
| 2005/0027201 A1* | 2/2005 | Badilini ............ A61B 5/338 600/509 |
| 2006/0264769 A1 | 11/2006 | Satin et al. |
| 2007/0031019 A1 | 2/2007 | Lesage |
| 2007/0032733 A1 | 2/2007 | Burton |
| 2007/0060829 A1 | 3/2007 | Pappone |
| 2007/0219452 A1 | 9/2007 | Cohen et al. |
| 2008/0077032 A1 | 3/2008 | Holmes et al. |
| 2008/0140143 A1 | 6/2008 | Ettori |
| 2008/0177192 A1 | 7/2008 | Chen |
| 2008/0205722 A1 | 8/2008 | Schaefer |
| 2008/0234576 A1 | 9/2008 | Gavit-Houdant et al. |
| 2008/0288493 A1 | 11/2008 | Yang et al. |
| 2009/0099468 A1 | 4/2009 | Thiagalingam |
| 2009/0275850 A1 | 11/2009 | Mehendale |
| 2010/0266170 A1 | 10/2010 | Khamene |
| 2011/0028848 A1 | 2/2011 | Shaquer |
| 2011/0118590 A1 | 5/2011 | Zhang |
| 2011/0251505 A1 | 10/2011 | Narayan |
| 2011/0307231 A1 | 12/2011 | Kirchner |
| 2012/0173576 A1 | 7/2012 | Gillam et al. |
| 2013/0006131 A1 | 1/2013 | Narayan |
| 2013/0096394 A1 | 4/2013 | Gupta |
| 2013/0131529 A1 | 5/2013 | Jia |
| 2013/0131629 A1 | 5/2013 | Jia |
| 2013/0150742 A1 | 6/2013 | Briggs |
| 2013/0197881 A1 | 8/2013 | Mansi et al. |
| 2013/0268284 A1 | 10/2013 | Heck |
| 2013/0304445 A1 | 11/2013 | Iwamura et al. |
| 2014/0005562 A1 | 1/2014 | Bunch |
| 2014/0088943 A1 | 3/2014 | Trayanova et al. |
| 2014/0107511 A1 | 4/2014 | Banet |
| 2014/0122048 A1 | 5/2014 | Vadakkumpadan et al. |
| 2014/0200575 A1 | 7/2014 | Spector |
| 2014/0276152 A1 | 9/2014 | Narayan |
| 2015/0005652 A1 | 1/2015 | Banet et al. |
| 2015/0057522 A1 | 2/2015 | Nguyen |
| 2015/0216432 A1 | 8/2015 | Yang |
| 2015/0216434 A1 | 8/2015 | Ghosh |
| 2015/0216438 A1 | 8/2015 | Bokan et al. |
| 2015/0294082 A1 | 10/2015 | Passerini et al. |
| 2016/0008635 A1 | 1/2016 | Burdette |
| 2016/0038743 A1 | 2/2016 | Foster et al. |
| 2016/0113725 A1 | 4/2016 | Trayanova et al. |
| 2016/0135702 A1 | 5/2016 | Perez |
| 2016/0135706 A1 | 5/2016 | Sullivan |
| 2016/0143553 A1 | 5/2016 | Chien |
| 2016/0150958 A1* | 6/2016 | Kranz ............ A61B 5/339 600/515 |
| 2016/0192868 A1 | 7/2016 | Levant et al. |
| 2016/0331337 A1 | 11/2016 | Ben-Haim |
| 2017/0027465 A1 | 2/2017 | Blauer |
| 2017/0027649 A1 | 2/2017 | Kiraly |
| 2017/0061617 A1 | 3/2017 | Cochet |
| 2017/0065195 A1 | 3/2017 | Nguyen |
| 2017/0068796 A1 | 3/2017 | Passerini et al. |
| 2017/0079542 A1 | 3/2017 | Spector |
| 2017/0112401 A1 | 4/2017 | Rapin |
| 2017/0150928 A1 | 6/2017 | del Alamo de Pedro |
| 2017/0156612 A1 | 6/2017 | Relan |
| 2017/0161439 A1 | 6/2017 | Raduchel et al. |
| 2017/0161896 A1 | 6/2017 | Blake, III |
| 2017/0178403 A1 | 6/2017 | Krummen |
| 2017/0185740 A1 | 6/2017 | Seegerer |
| 2017/0202421 A1 | 7/2017 | Hwang et al. |
| 2017/0202521 A1 | 7/2017 | Urman et al. |
| 2017/0209698 A1 | 7/2017 | Villongco |
| 2017/0231505 A1 | 8/2017 | Mahajan |
| 2017/0273588 A1 | 9/2017 | He |
| 2017/0319089 A1 | 11/2017 | Lou |
| 2017/0319278 A1 | 11/2017 | Trayanova |
| 2017/0330075 A1 | 11/2017 | Tuysuzoglu |
| 2017/0367603 A1 | 12/2017 | Spector |
| 2018/0012363 A1 | 1/2018 | Seiler |
| 2018/0020916 A1 | 1/2018 | Ruppersberg |
| 2018/0032689 A1 | 2/2018 | Kiranyaz |
| 2018/0260706 A1 | 9/2018 | Galloway et al. |
| 2018/0279896 A1 | 10/2018 | Ruppersberg |
| 2018/0318606 A1 | 11/2018 | Robinson |
| 2018/0333104 A1 | 11/2018 | Sitek |
| 2019/0038363 A1 | 2/2019 | Adler |
| 2019/0060006 A1 | 2/2019 | Van Dam |
| 2019/0069795 A1 | 3/2019 | Kiranya |
| 2019/0104951 A1 | 4/2019 | Valys |
| 2019/0104958 A1 | 4/2019 | Rappel |
| 2019/0125186 A1 | 5/2019 | Ruppersberg |
| 2019/0216350 A1 | 7/2019 | Sullivan et al. |
| 2019/0223946 A1 | 7/2019 | Coates |
| 2019/0304183 A1 | 10/2019 | Krummen |
| 2019/0328254 A1 | 10/2019 | Villongco |
| 2019/0328257 A1 | 10/2019 | Villongco |
| 2019/0328457 A1 | 10/2019 | Villongco et al. |
| 2019/0328458 A1 | 10/2019 | Shmayahu |
| 2019/0332729 A1 | 10/2019 | Villongco |
| 2019/0333639 A1 | 10/2019 | Villongco |
| 2019/0333641 A1 | 10/2019 | Villongco |
| 2019/0333643 A1 | 10/2019 | Villongco |
| 2020/0069205 A1* | 3/2020 | Banerjee ............ A61B 5/364 |
| 2020/0324118 A1 | 10/2020 | Garner et al. |
| 2020/0405148 A1 | 12/2020 | Tran |
| 2021/0015390 A1 | 1/2021 | Zhou et al. |
| 2021/0118534 A1* | 4/2021 | Lyman ............ G06V 30/19173 |

(56) References Cited

U.S. PATENT DOCUMENTS

| | | | |
|---|---|---|---|
| 2021/0205025 A1 | 7/2021 | Erkamp et al. | |
| 2021/0219923 A1 | 7/2021 | Eun Young Yang | |
| 2021/0259560 A1 | 8/2021 | Venkatraman | |
| 2022/0047237 A1 | 2/2022 | Liu | |

FOREIGN PATENT DOCUMENTS

| | | | |
|---|---|---|---|
| CN | 111466905 A | * | 7/2020 |
| CN | 113851225 A | | 12/2021 |
| CN | 114206218 A | | 3/2022 |
| JP | H4174643 A | | 6/1992 |
| JP | H08289877 A | | 11/1996 |
| JP | 2012508079 A | | 4/2012 |
| JP | 2015163199 A | | 9/2015 |
| JP | 2017-140381 A | | 8/2017 |
| KR | 20070094646 | * | 3/2009 |
| WO | 2006066324 A1 | | 6/2006 |
| WO | 2015153832 A1 | | 10/2015 |
| WO | 2018190715 A1 | | 10/2018 |
| WO | 2019118640 A1 | | 6/2019 |
| WO | 2020101864 | | 5/2020 |
| WO | 2020142539 | | 7/2020 |

OTHER PUBLICATIONS

Ganesh, Shambavi, et al. "Combining optical character recognition with paper ECG digitization." IEEE Journal of Translational Engineering in Health and Medicine 9 (2021): 1-9. (Year: 2021).*
Andreu et al., "Integration of 3D Electroanatomic Maps and Magnetic Resonance Scar Characterization Into the Navigation System to Guide Ventricular Tachycardia Ablation", Circ Arrhythm Electrophysiol, Oct. 2011, 4(5), pp. 674-683.
Acharya et al., A deep convolutional neural network model to classify heartbeats, Computers in Biology and Medicine (Oct. 1, 2017) vol. 89, pp. 389-396.
Acharya et al., Deep convolutional neural network for the automated detection and diagnosis of seizure using EEG signals, Computers in Biology and Medicine (Sep. 1, 2018, Epub Sep. 27, 2017) 100:270-278.
Acharya UR, Fujita H, Lih OS, Hagiwara Y, Tan JH, Adam M. Automated detection of arrhythmias using different intervals of tachycardia ECG segments with convolutional neural network. Information sciences. Sep. 1, 2017 ;405:81-90.
Bond et al., XML-BSPM: An XML Format for Storing Body Surface Potential Map Recordings, BMC Medical Informatics and Decision Making 2010, 10:28, http://www.biomedcentra.com/1472-6947/10/28, 27 pages.
Carrault, Guy, et al. "A model-based approach for learning to identify cardia arrhythias," Joint European Conference on Artificial Intellegence in Medicine and Medicine Decision Making. Springer, Berline Heidelberg, 1999.
Carrualt, Guy, et al. "Temporal abstraction and inductive logic programming for arrhythima recognition from electrocardiograms." Artificial intelligence in medicine 28.3 (2003): 231-263.
Cobb, Leonard A., et al. "Changing incidence of out-of-hospital ventricular fibrillation, 1980-2000." Jama 288.23 (2002): 3008-3013.
Cuculich, Phillip S. et al., "Noninvasive Cardiac Radiation for Ablation of Ventricular Tachycardia" New England Journal of Medicine, 377; 24, pp. 2325-2336, Dec. 14, 2017.
Dandu Ravi Varma, "Managing DICOM images: Tips and tricks for the radiologist", Indian J Radiol Imaging., Jan.-Mar. 2012; 22(1), pp. 4-13.
Extended European Search Report issued in European Patent Application No. 19215701.4 and dated Apr. 17, 2020, 9 pages.
Extended European Search Report issued in European Patent Application No. 19792821.1 and dated Mar. 15, 2021. 10 pages.
Frank, Ernest, "An Accurate, Clinically Practical System for Spatial Vectorcardiography," American Heart Association, Inc., downloaded from http://circ.ahajournals.org/ at Cons California Dig Lib on Mar. 12, 2014.
Garg, et al., ECG Paper Records Digitization Through Image Processing Techniques, vol. 48, No. 13, Jun. 2012, 4 pages.
Gonzales, Matthew J., et al. "Structural contributions to fibrillatory rotors in a patient-derived computational model of the atria." EP Europace 16.suppl 4 (2014): iv3-iv10.
Graham, Adam J. et al., "Evaluation of ECG Imaging to Map Haemodynamically Stable and Unstable Ventricular Arrhythmias" downloaded from http://ahajournals.org on Jan. 22, 2020.
Halevy, A., Norvig, P., & Pereira, F. (2009). The unreasonable effectiveness of data. IEEE intelligent systems, 24(2), 8-12.
Hershey S, Chaudhuri S, Ellis DP, Gemmeke JF, Jansen A, Moore RC, Plakal M, Platt D, Saurous RA, Seybold B, Slaney M. Cnn architectures for large-scale audio classification. In2017 ieee international conference on acoustics, speech and signal processing ( icassp) Mar. 5, 2017 (pp. 131-135). IEEE.
Hren, Rok, et al. "Value of simulated body surface potential maps as templates in localizing sites of ectopic activation for radiofrequency ablation" Physiol. Meas. 18 (1997) 373-400. Mar. 7, 1997.
International Search Report and Written Opinion issued for PCT/US16/68449 mailed on Mar. 29, 2017.
International Search Report and Written Opinion issued for PCT/US2019/029181 mailed Sep. 16, 2019.
International Search Report and Written Opinion issued for PCT/US2019/029184 mailed Sep. 24, 2019.
International Search Report and Written Opinion issued for PCT/US2019/058217 mailed Feb. 7, 2020, 9 pages.
International Search Report and Written Opinion issued for PCT/US2019/069136 mailed May 11, 2020, 13 pages.
International Search Report and Written Opinion issued in PCT/US2020/036754 mailed Oct. 15, 2020, 13 pages.
International Searching Authority, International Search Report and Written Opinion, PCT Patent Application PCT/US2021/057616, mailed Jan. 28, 2022, 9 pages.
Jacquemet, V., "Lessons from Computer Simulation of Ablation of Atrial Fibrillation", J Physiol. 594(9): 2417-2430, May 1, 2016.
JPO, Notice of Reasons for Refusal for Japanese Patent Application No. 2018-527085. Mail Date: Dec. 23, 2020. 14 pages with English translation.
Kiranyaz et al., Real-time patient-specific EDG classification by 1-D convolutional neural networks, IEEE Transactions on Biomedical Engineering (Mar. 2016) 63:664-675.
Kiranyaz S, Ince T, Hamila R, Gabbouj M. Convolutional neural networks for patient-specific ECG classification. In2015 37th Annual International Conference of the IEEE Engineering in Medicine and Biology Society (EMBC) Aug. 25, 2015 (pp. 2608-2611 ). IEEE.
Kors, J.A., et al., "Recontruction of the Frank vectorcardiogram from standard electrocardiogramads: diagnostic comparison of different methods," European Heart Journal, vol. 11, Issue 12, Dec. 1, 1990, pp. 1083-1092.
Krishnamurthy, Adarsh, et al. "CRT Response is Greater in Patients With Larger Fraction of the Myocardium Performing Negative Regional Work." Circulation 128.Suppl 22 (2013): A11135-A11135, Abstract only.
Krishnamurthy, Adarsh, et al. "Patient-specific models of cardiac biomechanics." Journal of computational physics 244 (2013): 4-21.
Krummen, David E., et al. "Rotor stability separates sustained ventricular fibrillation from selfterminating episodes in humans." Journal of the American College of Cardiology 63.24 (2014): 2712-2721.
Lee H, Kwon H. Going deeper with contextual CNN for hyperspectral image classification. IEEE Transactions on Image Processing, Jul. 11, 2017;26(10):4843-55.
Li D, Zhang J, Zhang Q, Wei X. Classification of ECG signals based on 1 D convolution neural network. In2017 IEEE 19th International Conference on e-Health Networking, Applications and Services (Healthcom) Oct. 12, 2017 (pp. 1-6). IEEE.
Light, D., E., et al. "Two Dimensional Arrays for Real Time Volumetric and Intracardiac Imaging with Simultaneous Electrocardiagram", 1196-2000 IEEE Ultrasonics Symposium, retrieved on Sep. 24, 2021.
Lyon, et al. J.R. Soc Interface vol. 15:1-18. (2017).
Nash, Martyn P., et al. "Evidence for multiple mechanisms in human ventricular fibrillation." Circulation 114.6 (2006): 536-542.

(56) References Cited

OTHER PUBLICATIONS

Office Action mailed Mar. 18, 2021, Canada App. 3080944.
Office Action Response filed Mar. 23, 2021, U.S. Appl. No. 17/082,892.
Pan, J., S., et al., "A Survey on Transfer Learning," IEEE Transactions on Knowledge and Data Engineering, vol. 22, No. 10, Oct. 2010, 15 pages.
Potse, Mark et al., "Continuos Localization of Cardian Activation Sites Using a Database of Multichannel ECG Recordings" IEEE Transactions of Biomedical Engineering, vol. 47, No. 5, May 2000, pp. 682-689.
Rahhal et al., Convolutional neural networks for electrocardiogram classification, Journal of Medical and Biological Engineering (Mar. 30, 2018) 38: 1014-1025.
Ravichandran et al., Novel Tool for Complete Digitization of Paper Electrocardiography Data, vol. 1, 2013, 7 pages.
Sapp et al., "Real-Time Localization of Ventricular Tachycardia Origin From the 12-Lead Electrocardiogram", JACC Clinical Electrophysiology, vol. 3, No. 7, Jul. 2017.
Sapp, John L. et al., "Real-Time Localization of Ventricular Tachycardia Origin From the 12-Lead Electrocardiogram" JACC: Clinical Electrophysiology by the Amercian College of Cardiology Foundation, vol. 3, 2017, pp. 687-699.
Sharma, et al., Digitalization of ECG Records, International Journal of Engineering Research and Applications, www.ijera.com, ISSN: 2248-9622, vol. 10, Issue 6, (Series-VIII) Jun. 2020, pp. 01-05.
Shin HC, Roth HR, Gao M, Lu L, Xu Z, Nogues I, Yao J, Mollura D, Summers RM. Deep convolutional neural networks for computer-aided detection: CNN architectures, dataset characteristics and transfer learning. IEEE transactions on medical imaging. Feb. 11, 2016 ;35(5): 1285-98.
Si, Hang, "TetGen, a Delaunay-Based Quality Tetrahedral Mesh Generator," ACM Transactions on Mathematical Software, vol. 41, No. 2, Article 11, Jan. 2015, 36 pages.
Siregar, P. "An Interactive Qualitative Model in Cardiology" Computers and Biomedical Research 28, pp. 443-478, May 16, 1994.
Taggart, Peter, et al. "Developing a novel comprehensive framework for the investigation of cellular and whole heart electrophysiology in the in situ human heart: Historical perspectives, current progress and future prospects. " Progress in biophysics and molecular biology 115.2-3 (2014): 252-260.
Tajbakhsh, Nima et al., "Convolutional Neural Networks for Medical Image Analysis: Full Training or Fine Tuning?" IEEE Transactions on Medical Imaging (2016) vol. 35, e-pp. 1-17).
Ten Tusscher et al. "A model for human ventricular tissue." American Journal of PhysioloQy-Heart and Circulatory PhysioloQy 286.4 (2004): H1573-H1589.
Thakor and Tong (Annual Reviews in Biomedicine and Engineering (2004) vol. 6, 453-495).
Therrien R, Doyle S. Role of training data variability on classifier performance and generalizability. In Medical Imaging 2018: Digital Pathology Mar. 6, 2018 (vol. 10581, p. 1058109). International Society for Optics and Photonics.
Tobon, Catalina, et al. "Dominant frequency and organization index maps in a realistic three-dimensional computational model of atrial fibrillation." Europace; 14, suppl_5 (2012): v25-v32.
Tomašić, Ivan et al., "Electrocardiographic Systems With Reduced Numbers of Leads—Synthesis of the 12-Lead ECG," IEEE Reviews in Biomedical Engineering, vol. 7, 2014, pp. 126-142.
USPTO, Final Office Action received for U.S. Appl. No. 16/444,340. Mail Date: Dec. 23, 2020. 9 pages.
USPTO, Non-Final Office Action received for U.S. Appl. No. 16/295,934. Mail Date: Dec. 23, 2020. 12 pages.
USPTO, Restriction Requirement received for U.S. Appl. No. 17/082,892. Mail Date: Feb. 2, 2021. 8 pages.
USPTO, Non-Final Office Action received for U.S. Appl. No. 17/082,892. Mail Date: Mar. 1, 2021. 33 pages.
USPTO, Non-Final Office Action received for U.S. Appl. No. 17/082,835. Mail Date: Jan. 29, 2021. 22 pages.
USPTO, Office Action mailed Apr. 5, 2021, U.S. Appl. No. 17/082,835.
USPTO, Office Action mailed Apr. 12, 2021, U.S. Appl. No. 17/082,892.
USPTO, Office Action mailed Apr. 15, 2021, U.S. Appl. No. 16/043,054.
USPTO, Office Action mailed Jul. 14, 2021, U.S. Appl. No. 16/247,463.
Vadakkumpadan, Fijoy, et al. "Image-based estimation of ventricular fiber orientations for personalized modeling of cardiac electrophysiology." IEEE-TMI 31.5 (2012): 1051-1060.
Villongco, Christopher T., et al. "Patient-specific modeling of ventricular activation pattern using surface ECG-derived vectorcardiogram in bundle branch block." Progress in biophysics and molecular bioloQy 115.2 (2014): 305-313.
Vozda, M. et al., "Methods for derivation of orthogonal leads from 12-lead electrocardiogram: A review," Elsevier, Biomedical Signal Processing and Control 19 (2015), 23-34.
Xiong et al. Computing and Cardiology vol. 44: pp. 1-4. (2017).
Zhang, C., et al. "Patient-Specific ECG Classification Based on Recurrent Neural Networks and Clustering Technique," Proceedings of the IASTED International Conference in Biomedical Engineering (Bio Med 2017); Feb. 20-21, 2017 in Innsbruck, Austria, 5 pages.
Zhou, Shijie et al. "Localization of ventricular activation origin using patient-specific geometry: Preliminary results" J. Carciovasc Electrophysiol, 2018; 29: pp. 979-986.
Zhou, Shijie et al. "Rapid 12-lead automoated localization method: Comparison to electrocardiographic imaging (ECGI) in patient-specific geometry", Journal of Electrocardiology, vol. 51, 2018, pp. S92-S97.
Zhu X, Vondrick C, Fowlkes CC, Ramanan D. Do we need more training data ?. International Journal of Computer Vision.Aug. 2016;119(1):76-92.
Zubair M, Kim J, Yoon C. An automated ECG beat classification system using convolutional neural networks. In2016 6th international conference on IT convergence and security (ICITCS) Sep. 26, 2016 (pp. 1-5). IEEE.
Zentara, et al., ECG Signal Coding Methods in Digital Systems, Communication Papers of the Federated Conference on Computer Science and Information Systems,DOI: 10.15439/2018F108, ISSN 2300-5963 ACSIS, vol. 17, pp. 95-102.
Goodfellow, Ian et al., Generative Adversarial Nets, Advances in Neural Information Processing Systems, pp. 2672-2680, 2014.
He, Zhenliang et al., Facial Attribute Editing by Only Changing What You Want, IEEE Transactions on Image Processing, 2018.
International Search Report and Written Opinion received in Application No. PCT/US23/22146, dated Oct. 2, 2023, 14 pages.

* cited by examiner

ENCODING ELECTROCARDIOGRAPHIC DATA

CROSS-REFERENCE TO RELATED APPLICATION

This application claims the benefit of U.S. Provisional Application No. 63/346,500 filed on May 27, 2022, which is hereby incorporated by reference in its entirety.

BACKGROUND

Electrocardiography is an important technology for evaluating function of a heart of a patient. An electrocardiogram (ECG) is a recording of electrical activity of a heart that is typically measured by an ECG recorder via electrodes placed on the patient's skin. The electrodes measure the electrical activity of the heart during depolarization and repolarization of the cardiomyocytes during each cardiac cycle (e.g., heartbeat). An ECG commonly includes 12 leads or tracings of electrical activity that are collected from different angles using 10 electrodes. Each lead may be presented as a graph of voltage versus time. An ECG is typically presented (displayed or printed) with a background grid based on the time and voltage scale of the graphs. A background grid typically includes minor gridlines and major gridlines in both the horizontal and vertical axes with five minor gridlines per major gridline. A typical time scale is 25 millimeters per second (mm/sec), and a typical voltage scale is 10 millimeters per millivolt (mm/MV).

FIG. 1A is an ECG that includes a graph of a single lead. ECG 100 includes a plotline 101 that covers approximately three cardiac cycles. An ECG typically includes a background grid that includes major and minor gridlines. FIG. 1E illustrates the format of an example grid. Grid 130 include vertical major gridlines 131 and horizontal major gridlines 132. Between adjacent vertical major gridlines are four vertical minor gridlines 141, and between adjacent horizontal major gridlines are four horizontal minor gridlines 142. Major grid box 150 is bounded by adjacent vertical major gridlines 151 and adjacent horizontal major gridlines 152. A major grid box includes 25 minor grid boxes 160 that are each bounded by adjacent vertical minor gridlines 162 and adjacent horizontal minor gridlines 161. Each major grid box spans 0.20 seconds horizontally and 0.5 mV vertically. Minor grid box 170 is bounded by adjacent vertical minor gridlines 171 and adjacent horizontal minor gridlines 172. The example ECGs illustrated in the figures have had their background grids removed.

An ECG illustrates distinct phases of a cardiac cycle. FIG. 1D illustrates the phases of a cardiac cycle. The following table summarizes the phases:

| | |
|---|---|
| P wave | Atrial depolarization (contraction) |
| QRS complex | Ventricular depolarization (contraction) - Q, R, and S waves |
| ST segment | Between end of QRS complex and start of T wave |
| T wave | Ventricular repolarization (expansion) |
| U wave | After T wave; not always present |
| QT interval | From the beginning of the QRS complex to the end of the T wave representative of the interval from ventricular depolarization to repolarization - roughly indicative of the duration of an average ventricular action potential |
| PR interval | Between start of P wave and start of QRS complex |
| PR segment | Between end of P wave and start of QRS complex |
| TP segment | Between end of T wave and start of P wave |

An ECG can provide evidence of types of conditions of a heart. For example, a left bundle branch block may be indicated by criteria that includes a long QRS duration (>120 ms) with a predominantly negative terminal deflection in lead V1. A physician can review an ECG as an aid in evaluating the condition of a heart.

ECG analysis tools are also available to assist a physician in the evaluation of an ECG by providing ECG analysis data such as ECG analysis data of FIG. 1C. Some sophisticated ECG analysis tools may even provide an assessment of the condition of the heart such as having a left bundle branch block or a Mobitz I AV block. These ECG analysis tools may be standalone tools that are not integrated with an ECG recorder. In addition, researchers may develop custom ECG analysis tools that are specific to their cardiac research. Such ECG analysis tools may require input of a digital file of an ECG that is in a standard or custom ECG encoding (format). Several standard encodings have been developed such as the Standard Communication Protocol for Electrocardiography (SCP-ECG), Medical Waveform Format Encoding Rules (MFER), Health Level Seven (HL7), Extensible Markup Language (XML), and Digital Imaging and Communications in Medicine (DICOM).

Some ECG recorders, however, may not output a digital file that can then be input to an ECG analysis tool or stored for later access. Such ECG recorders may simply display or provide a printout of an ECG so a physician can evaluate a patient's condition based on visual inspection of the ECG. Unfortunately, the ECG output by such recorders cannot be input to ECG analysis tools and cannot be readily processed using digital tools or shared with others to assist in the evaluation. Although some attempts have been made to generate digital files from ECG printouts, those attempts have been less than satisfactory, in part because they have relied heavily on the background grid and input from users when generating the digital files.

DETAILED DESCRIPTION

Figure 1A:
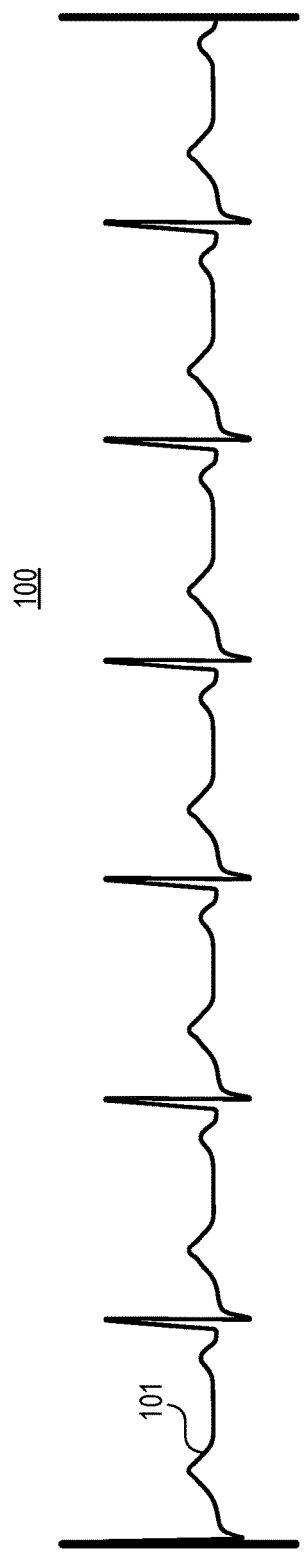
FIG. 1A is an ECG that includes a graph of a single lead.

Systems and methods are provided for generating a digital ECG file based on a scan of a printed or displayed (e.g., on a computer monitor or smartphone screen) ECG. In some aspects, an ECG digitizing system supports the generating of digital ECG files from scans of printed ECGs that may be in various formats. For example, a printed ECG may have only 1 plotline representing 1 lead (FIG. 1A), 5 plotlines with 3 plotlines representing 4 leads each and 2 plotlines representing rhythm tracings, 4 plotlines representing 1 lead each, 12 plotlines with each plotline representing an individual lead, and so on. In addition, a printed ECG may have no reference pulse, one reference pulse, one reference pulse at the beginning, in the middle, or at the end of each plotline, and so on. A printed ECG typically includes text, referred to as a lead identifier (e.g., aVL), that identifies the lead that each graph represents. A printed ECG may also include text indicating the time and/or voltage scale (e.g., 25 mm/sec and 10 mm/mV). A printed ECG may also include text representing patient information (e.g., demographics) and ECG analysis data related to the ECG (e.g., average QRS time).

Figure 1B:
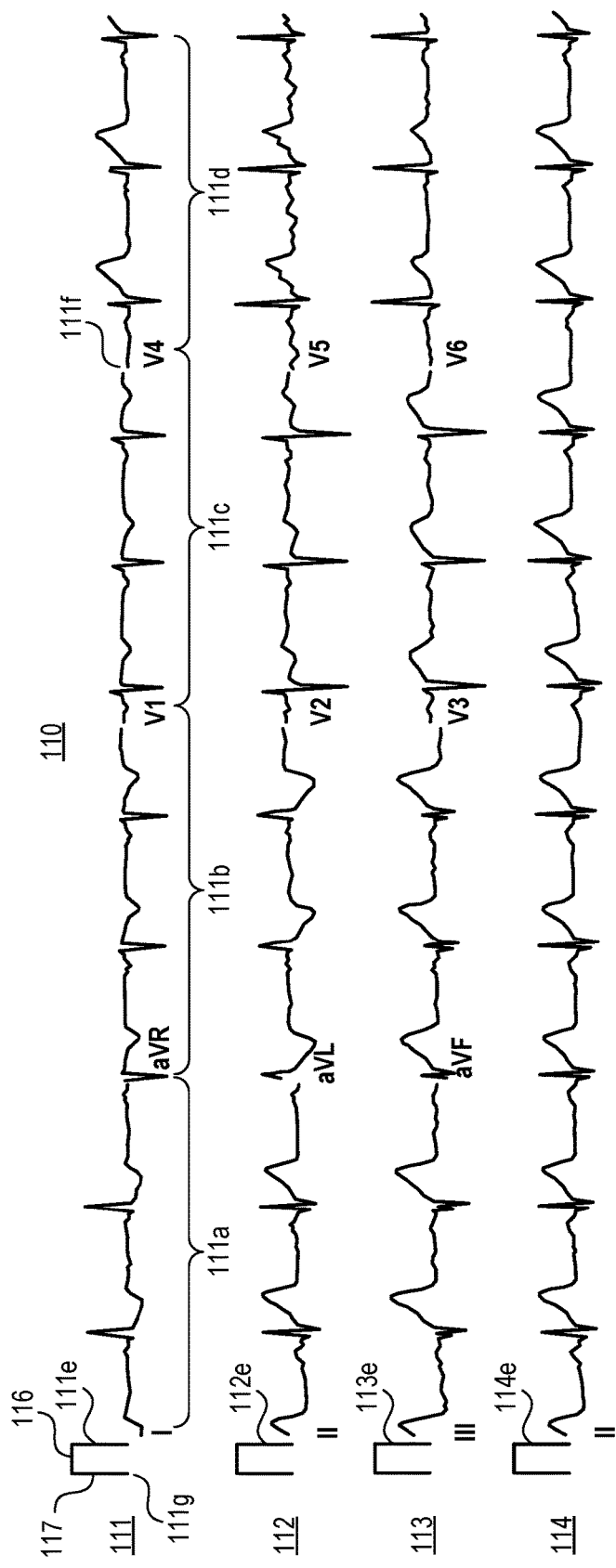
FIG. 1B is an ECG that includes graphs of 12 leads plus a rhythm tracing.

FIG. 1B is an ECG that includes graphs of 12 leads plus a rhythm tracing. ECG 110 includes three plotlines 111-113, each including graphs for four leads, and plotline 114, which is a graph of a rhythm tracing. Plotline 111 includes graphs 111*a*, 111*b*, 111*c*, and 111*d*. The graphs are identified with lead identifiers I, II, III, aVR, aVL, aVF, V1, V2, V3, V4, V5, and V6 below the start of the corresponding graph. For example, plotline 111 includes graphs 111*a*, 111*b*, 111*c*, and 111*d* for leads I, aVR, V1, and V4. Each graph of plotlines 111-113 covers approximately three cardiac cycles. The start of successive graphs on a plotline is indicated by the location of the lead identifiers. For example, the lead identifier V4 is positioned just below and aligned with the start of graph 111*d*. Also, there is a slight gap between successive graphs. For example, gap 111*f* is between graphs 111*c* and 111*d*. Plotline 114 is a rhythm strip or tracing that includes a graph for lead II that covers approximately 11 cardiac cycles. ECG 110 also includes reference tracings or pulses 111*e*-114*e* that indicate a time scale 116 and a voltage scale 117 of ECG 110, which are in this example 25 mm/sec and 10 mm/mV. The bottom of a reference pulse indicates the zero voltage point for the corresponding plotline. For example, the bottom 111*g* of reference pulse 111*e* indicates the zero voltage point for plotline 111.

Figure 1C:
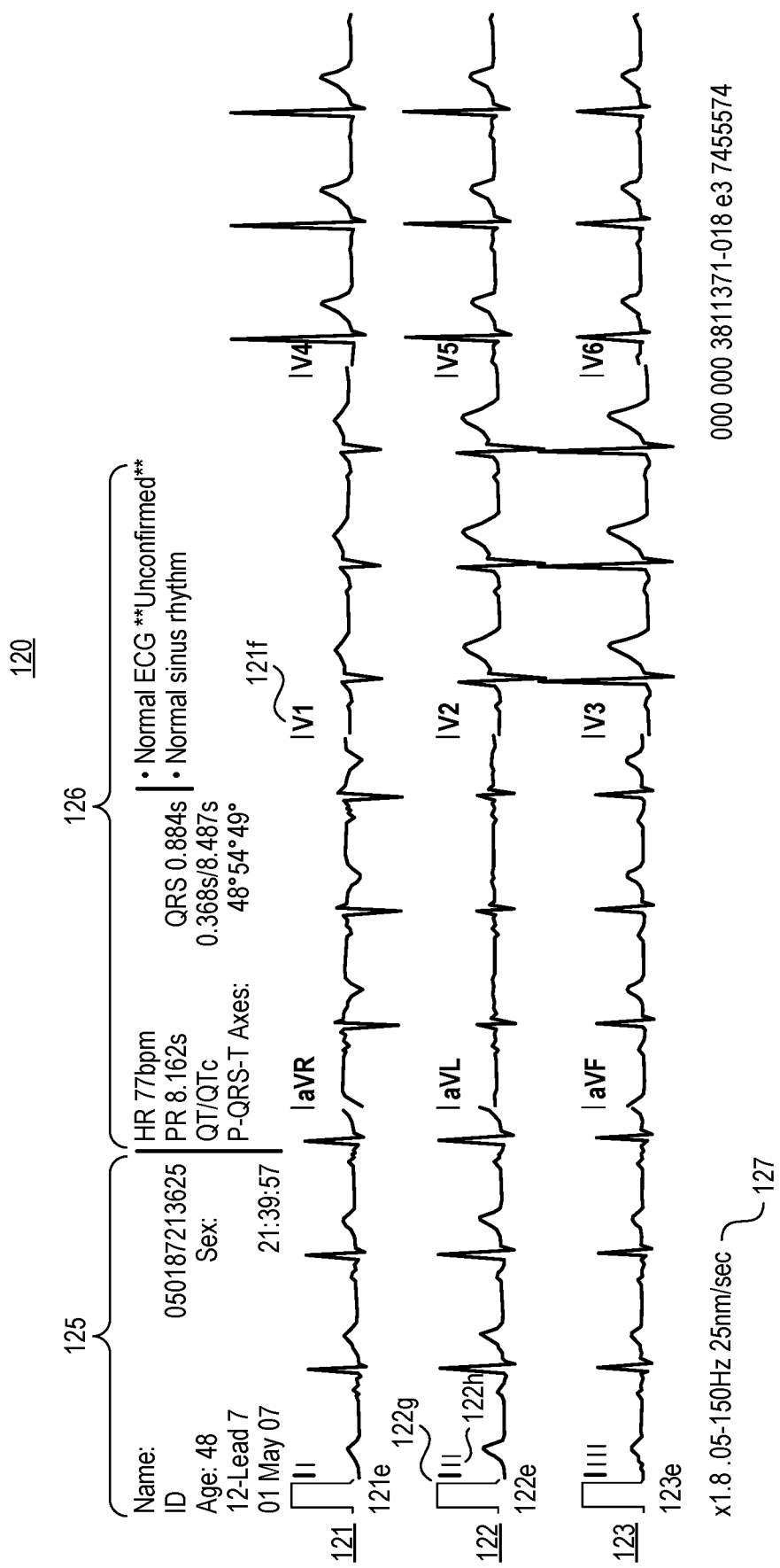
FIG. 1C is an ECG that includes graphs of 12 leads.
Figure 1D:
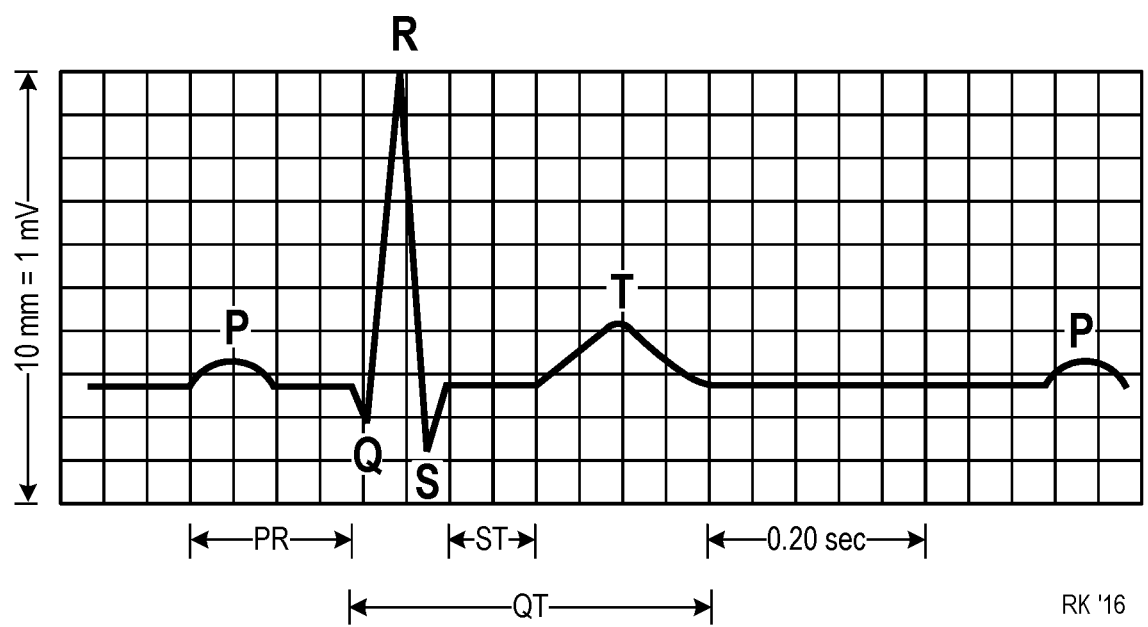
FIG. 1D illustrates the phases of a cardiac cycle.
Figure 1E:
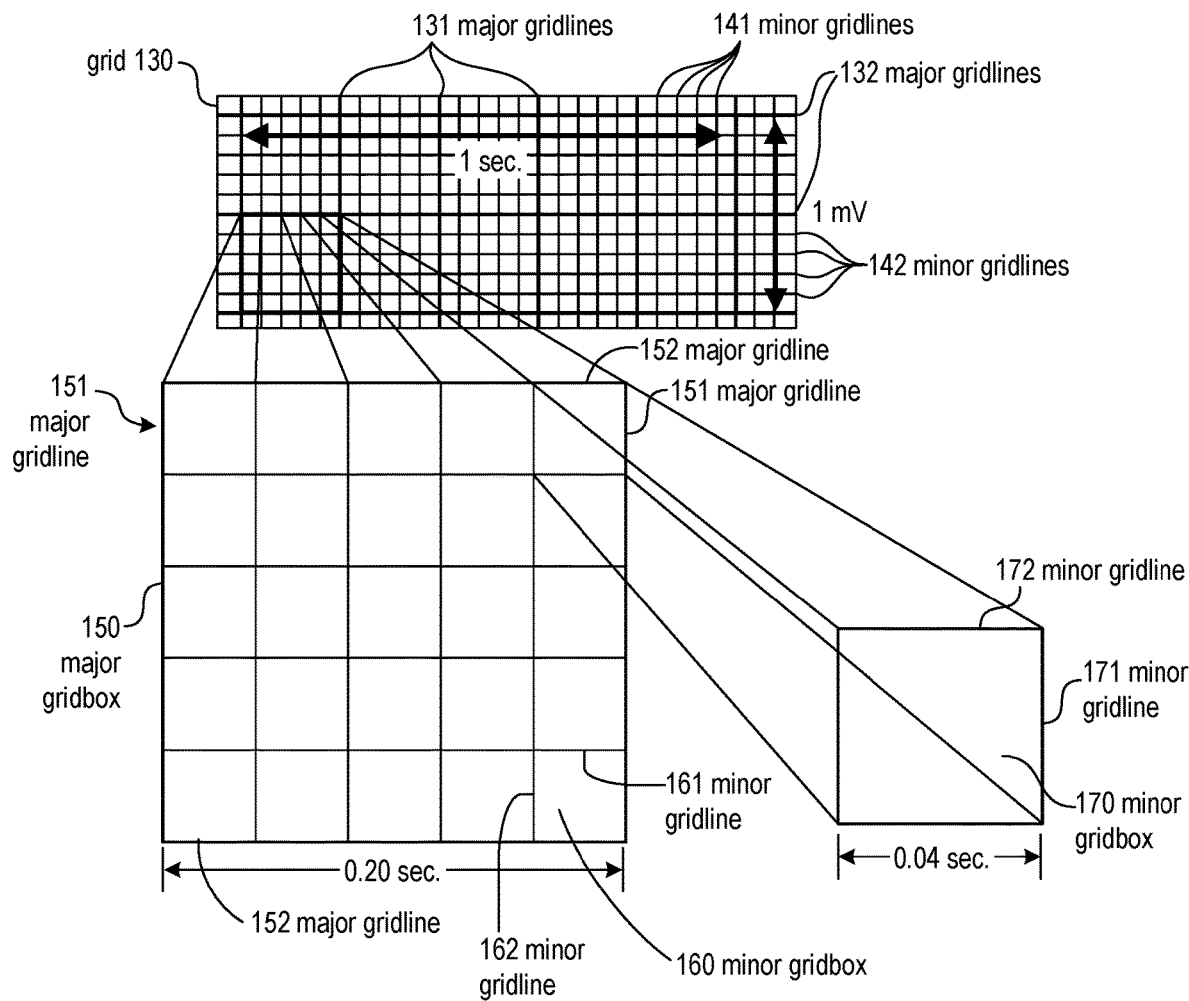
FIG. 1E illustrates the format of an example grid.

FIG. 1C is an ECG that includes graphs of 12 leads. ECG 120 includes three plotlines 121-123. Plotlines 121-123 each include graphs for 4 leads. ECG 120 does not include a plotline for a rhythm tracing. ECG 120 also includes reference pulses. The start of each graph is indicated by a vertical line above the graph and to the left of the lead identifier. For example, vertical line 121*f* indicates the start of graph V1. As another example, vertical line 122*g* indicates the start of the graph for lead II and is immediately to the left of the lead identifier for lead II (and visually appears as "III"). ECG 120 includes patient demographic information 125 such as name, gender, and age (which may be omitted for privacy reasons) and ECG analysis data 126 such as QRS duration. ECG 120 includes a legend 127 that indicates the time scale is 25 mm/sec. The ECG system may also allow the demographic information to be de-identified to comply with various government standards such as the Health Insurance Portability and Accountability Act (HIPAA) and the General Data Protection Regulation (GDPR). Such de-identifying may include omitting information such as a patient's name, date of birth, patient ID, city, and so on from metadata of the digital ECG file.

The ECG digitizing system provides components that are adapted to process scans of ECGs that can be in a wide variety of formats. An ECG image may be collected by taking a picture of an ECG printout using a camera (e.g., smartphone camera), by inputting an ECG printout into a scanner, by taking a screenshot of a displayed ECG, and so on. Many types of smartphones have software that takes pictures of documents and automatically orients the documents if, for example, the edges of the paper containing the document are not vertically aligned with the camera. Such software includes built-in camera software provided by Apple and Samsung camera applications and special-purpose software such as Microsoft's Office Lens. ECG images may have a wide range of resolutions (in pixels) such as 1024×1024 or 4032×3024, and they also may have a wide range of densities such as 100 pixels/mm. In addition, an ECG image may be in color (e.g., RGB values: 3×16 bits per pixel) or grey scale (e.g., 16 bits per pixel). An ECG image may have metadata indicating its resolutions. In the following, the ECG digitizing system is described primarily in the context of an ECG image whose resolution and density are not known in advance and that is in color. The ECG images may also be in various formats (e.g., JPEG and PDF) with various levels of compression. In the following, the ECG digitizing system is described in the context of an ECG image that is not compressed (e.g., has been decompressed) and converted (as needed) to a pixel or bitmap image (e.g., from a PDF format). The ECG digitizing system may employ optical character recognition (OCR) software (e.g., provided by a Microsoft Windows 10 API) to recognize the text of the ECG image. The OCR software identifies the text, its position on the ECG image (e.g., pixel-rows and pixel-columns), and its orientation (e.g., vertical or horizontal).

In some aspects, the ECG digitizing system may process the background grid to identify the major and minor gridlines, which may be useful in digitizing some ECG images. The ECG digitizing system may also identify colors for the background grid and for the plotline(s). For example, the background grid may be various shades of red or pine green, and the plotlines may be black or a color other than red or pine green. Each pixel of a graph (a point on the graph) is associated with an ECG measurement with a time and a voltage such as (t, v) where t represents the time at which the ECG measurement was collected (e.g., 0.7 sec) relative to the first measurement in a graph and v represents the voltage of the ECG measurement (e.g., 2.1 mV). The ECG digitizing system may also filter out the grid to simplify subsequent processing.

In some aspects, the ECG digitizing system processes ECG images that include one or more reference pulses. Initially, the ECG digitizing system may identify a reference pulse using various techniques. One technique searches an ECG image for parallel vertical lines that are connected by a horizontal line at the upper terminus of the vertical lines. An ECG image may be considered to include pixel-columns representing a time and pixel-rows representing a voltage. Each pixel is represented by a row and column coordinate (x, y). Horizontal lines and vertical lines are within the same pixel-row and pixel-column, respectively. However, the ECG digitizing system allows for a line to include pixels that are in nearby pixel-rows or pixel-columns to account for inaccuracies in scanning or differences in resolution. For example, the terminus pixels of the vertical lines of a reference pulse may be in different pixel-rows. In such a case, the ECG digitizing system may consider the horizontal line at the terminus to be at a pixel-row that is between those different pixel-rows. Another technique applies a match filter in the shape of a reference pulse to identify a reference pulse.

Once a reference pulse is identified, the ECG digitizing system determines the span of the reference pulse. The span includes a reference width pixel count (the number of pixel-columns that the reference pulse spans) and a reference height pixel count (the number of pixel-rows that the reference pulse spans). The ECG digitizing system also identifies a reference time and a reference voltage that the reference pulse represents. The reference time represents the time that the reference pulse represents (e.g., 0.2 sec), and the reference voltage represents the voltage that the reference pulse represents (e.g., 10 mV). The ECG digitizing system may use a reference time and a reference voltage that have default values or that have values derived from the text of the ECG image. For example, the ECG digitizing system may identify the number before the text "mm/sec" as the reference time. The ECG digitizing system then encodes per-pixel timing information based on the reference time and the reference width pixel count. The per-pixel timing information includes seconds/pixel or equivalently pixels/second. For example, if a reference pulse spans 100 pixel-columns and the reference time is 0.2 second, then the per-pixel timing information may be 500 pixels/second (e.g., 100 pixels/0.2 sec). The per-pixel timing information may also be derived from a combination of the text and a graph. The text may indicate the heart rate, and consecutive crossings of the horizonal origin of a graph may represent the pixel span of a beat. For example, the text may indicate a heart rate of 50 beats/min, and the consecutive crossings may indicate 600 pixels/beat. In such a case, the per-pixel timing information may be again 500 pixels/second (e.g., (50 beats/min)*(600 pixels/beat)/(1 min/60 sec)).

The ECG digitizing system also identifies a baseline pixel-row of a plotline of an ECG image which is the pixel-row that represents a zero voltage. In some ECGs, each plotline has an associated reference pulse. The bottom of the reference pulse typically indicates the baseline pixel-row. In other ECGs, the baseline pixel-row is aligned with a major row gridline near the start of a plotline. Since the start pixel of a plotline may be above or below that major row gridline, the ECG digitizing system may locate the closest major row gridline to that start pixel and use that major row gridline as the baseline pixel-row. Alternatively, the ECG digitizing system may determine an average pixel-row of a graph as the zero voltage. The ECG digitizing system may filter out portions of a graph (e.g., QRS complex) before determining the average.

The ECG digitizing system identifies the start pixel-column and end pixel-column of each graph. When an ECG image includes a reference pulse to the left of a plotline, the ECG digitizing system may set the start pixel-column of the plotline (and the first graph of the plotline) to the first pixel-column to the right of the reference pulse. Alternatively, the ECG digitizing system may set the first pixel-column to the left-most column of plotline that includes an ECG value or the average of the left-most pixel-columns of multiple plotlines. The ECG digitizing system may identify the last pixel-column of a plotline using analogous techniques such as based on the start of a reference pulse at the end of the plotline or the last ECG value of the plotline. The ECG digitizing system may identify the last pixel-column of a graph and the first pixel-column of the next graph of a plotline based on the pixel-column that contains a vertical dividing line between graphs. The ECG digitizing system may alternatively identify the end of a graph and the beginning of the next graph by dividing the end pixel-column minus the start pixel-column of a plotline by the number of graphs of the plotline.

The ECG digitizing system then proceeds with encoding the ECG. For each pixel-column of a graph, the ECG digitizing system identifies a voltage pixel-row of that pixel-column that has an ECG value (e.g., intensity indicating black or near black) and that is closest to the baseline pixel-row. The ECG system may then encode the voltage based on distance between the baseline pixel-row and the voltage pixel-row and based on the reference voltage and the reference height pixel count. Although a plotline is described primarily as being one pixel wide, a point on a plotline can span multiple pixels in the vertical direction depending on the resolution of the ECG image. The ECG digitizing system may employ an averaging technique to identify the voltage of a point. For example, the averaging technique may be based on a window (e.g., 5 pixel-columns) centered on the middle pixel-row of a pixel-column that contains multiple ECG values. The ECG system also encodes timing information for the ECG values. The timing information may be indicated as a seconds/voltage reading or as a time associated with each ECG measurement. The ECG digitizing system also encodes the reference pulses. The ECG digitizing system may also include metadata with the encoding to, for example, identify the time resolution and voltage resolution, patient demographic data, ECG analysis data, lead identifiers, and so on. The encoding may be based on a generic format or a standard format. If in a generic format, the encoding can then be converted to a standard format.

In some aspects, the ECG digitizing system accounts for ECGs that have multiple plotlines whose graphs may overlap in some pixel-columns or with an ECG value that is closest to the baseline pixel-row of a graph that is an ECG value of a graph printed above or below that graph. For example, the QRS portions of graphs for the V4 and V5 lead may overlap because of a low voltage on the V4 graph and a high voltage on the V5 graph. Rather than using the pixel-row with an ECG value that is closest to the baseline pixel-row, the ECG digitizing system may employ a more sophisticated approach for identifying the points of a graph. For example, the ECG digitizing system may select the pixel-row with an ECG value that is closest to the pixel-row with an ECG value of a prior pixel-column (e.g., closest to the prior point of the graph). As another example, the ECG digitizing system may first estimate a point on the graph based on a slope of the graph represented by the prior points and select the pixel-row with an ECG value that is consistent with that slope or represents a transition in direction of a slope. To account for graphs that overlap, the ECG digitizing system may first identify where graphs overlap based on overlapping pixel-rows of graphs. In such a case, the ECG digitizing system may determine the slope of a graph both before and after the overlap and may interpolate the pixel-rows that contain points on the graph based on the slopes and the span of the overlap. For example, the ECG digitizing system may assume that the point that is at the intersection of the slopes is a peak or a valley of the graph and set the other points of the graph in the overlap based on the slopes. The ECG digitizing system may initially skip over overlaps and then process the overlaps based on points before and after the overlaps.

In some aspects, the ECG digitizing system may validate the encoding based on comparison of the original ECG image to a derived ECG image that is derived from the encoding. The derived ECG image may include just the plotlines and is compared to the original ECG image with the text and the grid filtered. The ECG digitizing system then compares the derived ECG image and the original ECG image to assess whether the derived ECG image is an accurate representation of the original ECG image. For example, the ECG digitizing system may generate a similarity score (e.g., [0, 1]) based on an average of the differences of the locations of ECG values of the original ECG image and the derived ECG image. The differences may also be weighted based on the amount of difference. For example, a significant difference in locations within a pixel-column may be given a large weight, especially if differences in neighboring pixel-columns are also large. A similarity score of one may indicate a perfect match. The ECG digitizing system may also attempt to align the pixel-rows and pixel-columns of the ECG images to account for inaccuracies in identification of baseline pixel-rows and baseline pixel-columns (e.g., representing zero time of a graph). The ECG digitizing system may also adjust the ECG encoding based on the differences by, for example, correcting voltages that are determined to be inaccurate. The ECG digitizing system may also display the original ECG image and the derived ECG image so that a person can assess the accuracy of the derived ECG image and thus the encoding. The ECG system may allow the person to identify regions that are deemed inaccurate.

In some aspects, the ECG digitizing system may use various machine learning techniques to assist in the digitizing of ECG images. For example, a format machine learning model (e.g., a convolutional neural network (CNN)) may be trained to identify the format of an ECG image. The training data may include ECG images labeled with their format. The formats may include 4 plotlines with 3 plotlines with 4 leads per plotline and 1 plotline with a rhythm tracing, 2 plotlines with 1 lead per plotline, and so on. To determine the format of an ECG image, the ECG image is input to the format machine learning model and the format is output. As another example, a reference pulse machine learning model may be trained to identify the spans of reference pulses of an ECG image. The training data may include ECG images labeled with the spans of reference pulses. To determine the span of reference pulses of an ECG image, the ECG image is input to the reference pulse machine learning model and the spans are output. As another example, an interpolate machine learning model may be trained to assist in interpolating points of a graph that overlap with points of another graph. The training data may include points of peaks and valleys of graphs with points near the peak or valley removed and used as labels. To interpolate points of an overlap, the points of a graph near a peak or a valley with the overlap removed are input to the interpolate machine learning model and points near the peak or valley are output. As another example, a scale machine learning model may be trained to identify the time and voltage scales of an ECG image. Depending on the clarity of the ECG image, text recognition may not be able to identify the scale. The training data may include ECG images or portions of ECG images with text for scales labeled with their scale (e.g., 25 mm/sec or 50 mm/sec). To identify the time and voltage scales of an ECG image, a portion of an ECG image that may contain a scale is input to the scale machine learning model and the scale is output.

In some aspects, the ECG digitizing system may employ machine learning to generate an encoding of a graph directly from the ECG image. An encoding machine learning model may be trained to generate an encoding from a graph of an ECG image. The training data may include portions of ECG images corresponding to a graph that are each labeled with an encoding of the graph (e.g., time and voltage of each point of the graph). To encode a graph of an ECG image, the graph is input to the encoding machine learning model and the encoding is output. Irrespective of how the ECG digitizing system generates an encoding, the ECG digitizing system may apply various machine learning models prior to generating the encoding such as the scale machine learning model and the format machine learning model.

In some aspects, the ECG digitizing system employs various techniques to process ECG images that are collected from printed ECGs that are in some way damaged. For example, a printed ECG may be damaged because it was folded or crumpled, is a low-quality copy or fax of a high-quality printed ECG, has a portion missing (e.g., a portion with reference pulses has been cut off), and so on. When a printed ECG has been folded or crumpled, the gridlines of the ECG image may have curves and thus are not horizontal or vertical. To correct for such damage, the ECG digitizing system may identify an end of a horizontal major gridline. The ECG digitizing system then follows the major gridline based on its color (e.g., RGB values) and straightens the major gridline by applying a transformation (e.g., horizontal shifts, rotation, or linear/non-linear warping) to a segment that is not horizontally aligned to copy the pixel values of the major gridline to be horizontally aligned. The ECG digitizing system also copies the pixel values between that major gridline and an adjacent major gridline based on the corrected location of the major gridline. The amount of translation may be based on a transformation matrix that may be derived from the curvature of portions of the gridline.

When a printed ECG is a low-quality copy of a high-quality printed ECG, the printed ECG may have gridlines and plotlines that vary in their color such as having different intensity levels, slightly different colors, or missing portions (e.g., black where a color should be). To process such low-quality copies, the ECG digitizing system may perform a preprocessing step to correct the colors or fill in the missing colors. For example, the ECG digitizing system may process the ECG image with a moving window and fill in gaps when the pixels at one end and the pixels at the opposite end of the moving window have the same (or nearly the same) color. Such filling in of the gaps (especially in the plotlines) will improve the quality of the later digitization.

The ECG digitizing system may employ a format database of printed ECG formats that specify the format such as locations of various elements on a printed ECG. For example, one format may include demographic information and one plotline with four graphs, and another may include no demographic information, three plotlines with four graphs each, one reference pulse, and a rhythm interpretation (e.g., "atrial fibrillation"). As to demographic information, a format may specify the location of the description of data (e.g., "Name") and the location of the corresponding data (e.g., "John Doe"). If the format is known, the ECG digitizing system may use the format to assist in generating the digital ECG file. For example, the ECG digitizing system may use the location of the Name field as specified by the format to confirm or assist in the text recognition. If the printed ECG format of a printed ECG is not known in advance, the ECG digitizing system may select a printed ECG format from the format database that best matches the format derived from the ECG image. If a printed ECG is missing a portion, the printed ECG format that best matches the remaining portion may be selected.

Figure 2:
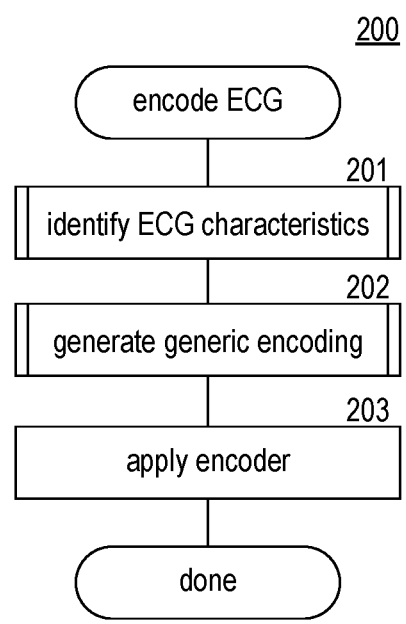
FIG. 2 is a flow diagram that illustrates processing of an "encode ECG" component of the ECG digitizing system in some aspects.

FIG. 2 is a flow diagram that illustrates processing of an "encode ECG" component of the ECG digitizing system in some aspects. The "encode ECG" component 200 controls the overall digitizing of an ECG image. In block 201, the component invokes an "identify ECG characteristics" component to identify characteristics of the ECG image such as text, resolution, and so on. In block 202, the component invokes a "generate generic encoding" component to generate a generic encoding of the ECG image. In block 203, the component applies an encoder to generate a standard encoding (e.g., DICOM encoding) from the generic encoding. The component then completes.

Figure 3:
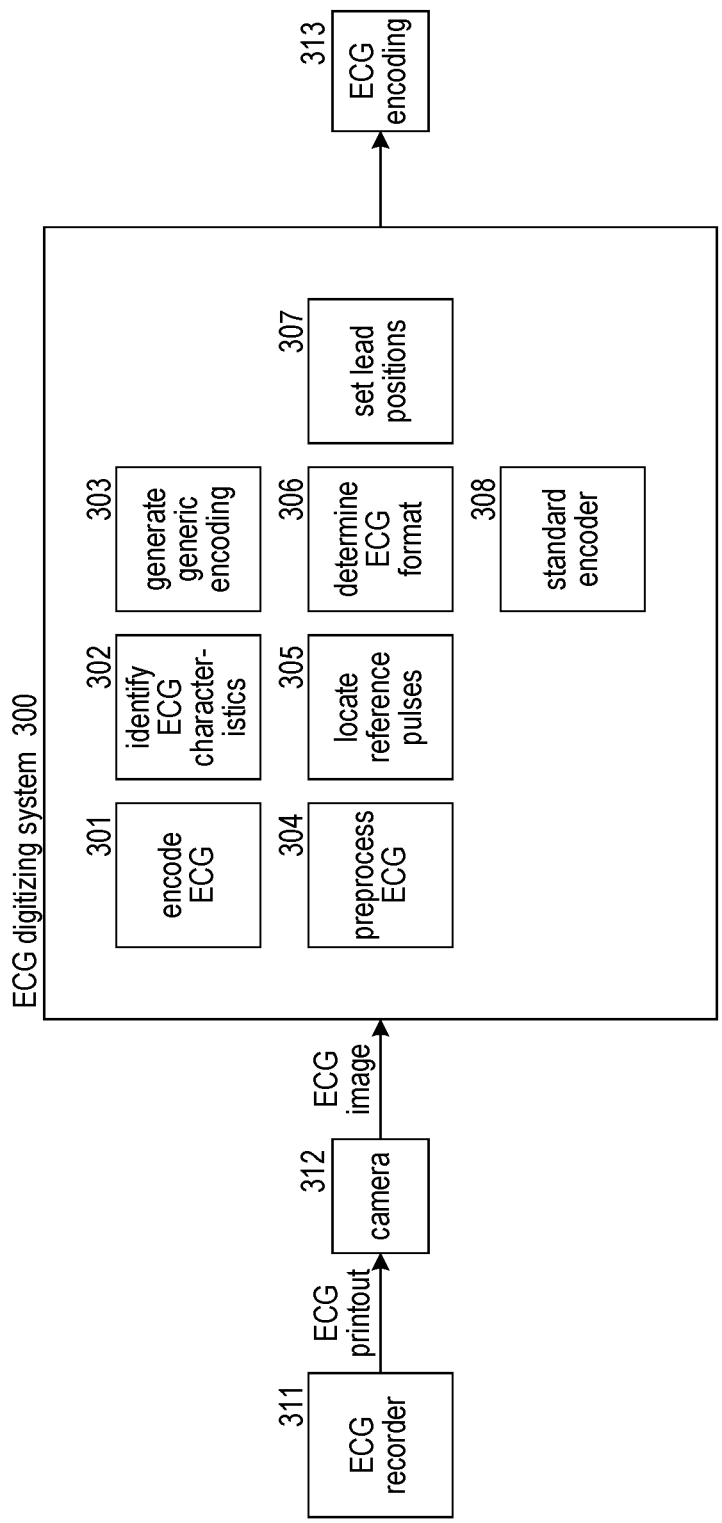
FIG. 3 is a block diagram that illustrates components of the ECG digitizing system in some aspects.

FIG. 3 is a block diagram that illustrates components of the ECG digitizing system in some aspects. The ECG digitizing system 300 includes an "encode ECG" component 301, an "identify ECG characteristics" component 302, and a "generate generic encoding" component 303. The ECG digitizing system also includes a "preprocess ECG image" component 304, a "locate reference pulses" component 305, a "determine ECG format" component 306, a "set lead positions" component 307, and a standard encoder 308. An ECG recorder 311 generates an ECG printout, and a camera 312 collects an image of the ECG printout and generates an ECG image. The ECG digitizing system outputs an ECG encoding 313. The "identify ECG characteristics" component invokes the "preprocess ECG image" component, the "locate reference pulses" component, and the "determine ECG format" component. The standard encoder is invoked to convert a generic encoding to a standard encoding.

The computing systems on which the ECG digitizing system may be implemented may include a central processing unit, input devices, output devices (e.g., display devices and speakers), storage devices (e.g., memory and disk drives), network interfaces (e.g., Ethernet or Wi-Fi), graphics processing units, cellular radio link interfaces, Bluetooth, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the ECG digitizing system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The ECG digitizing system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the ECG digitizing system may be implemented in hardware using, for example, an application-specific integrated circuit (ASIC) or a field programmable gate array (FPGA).

A machine learning model employed by the ECG digitizing system may be any of a variety or combination of classifiers that output a discrete value, range of values (e.g., continuous classifications), probabilities, and so on. A classifier may be a neural network such as a convolutional, recurrent, or autoencoder neural network, a support vector machine, a Boltzmann machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface.

Various techniques can be used to train a support vector machine such as, adaptive boosting, which is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function (RBF) network and a standard gradient descent as the search technique.

A CNN has multiple layers such as a convolutional layer, a rectified linear unit (ReLU) layer, a pooling layer, a fully connected (FC) layer, and so on. Some more complex CNNs may have multiple convolutional layers, ReLU layers, pooling layers, and FC layers.

A convolutional layer may include multiple filters (also referred to as kernels or activation functions). A filter inputs a convolutional window, for example, of an image, applies weights to each pixel of the convolutional window, and outputs an activation value for that convolutional window. For example, if the static image is 256 by 256 pixels, the convolutional window may be 8 by 8 pixels. The filter may apply a different weight to each of the 64 pixels in a convolutional window to generate the activation value, also referred to as a feature value. The convolutional layer may include, for each filter, a node (also referred to as a neuron)

for each pixel of the image, assuming a stride of one with appropriate padding. Each node outputs a feature value based on a set of weights for the filter that are learned by an optimizer by adjusting the weights after each iteration.

The ReLU layer may have a node for each node of the convolutional layer that generates a feature value. The generated feature values form a ReLU feature map. The ReLU layer applies a filter to each feature value of a convolutional feature map to generate feature values for a ReLU feature map. For example, a filter such as max(0, activation value) may be used to ensure that the feature values of the ReLU feature map are not negative.

The pooling layer may be used to reduce the size of the ReLU feature map by downsampling the ReLU feature map to form a pooling feature map. The pooling layer includes a pooling function that inputs a group of feature values of the ReLU feature map and outputs a feature value.

A generative adversarial network (GAN) or an attribute (attGAN) may also be used. An attGAN employs a GAN to train the generator model. (See, Zhenliang He, Wangmeng Zuo, Meina Kan, Shiguang Shan, and Xilin Chen, "AttGAN: Facial Attribute Editing by Only Changing What You Want," IEEE Transactions on Image Processing, 2019; and Ian Goodfellow, Jean Pouget-Abadie, Mehdi Mirza, Bing Xu, David Warde-Farley, Sherjil Ozair, Aaron Courville, and Yoshua Bengio, "Generative Adversarial Nets," Advances in Neural Information Processing Systems, pp. 2672-2680, 2014, which are hereby incorporated by reference.) An attGAN includes a generator and discriminator and an attGAN classifier and is trained using training data that includes input images of objects and input attribute values of each object. The generator includes a generator encoder and a generator decoder. The generator encoder inputs an input image and is trained to generate a latent vector of latent variables representing the input image. The generator decoder inputs the latent vector for an input image and the input attribute values. The attGAN classifier inputs an image and generates a prediction of its attribute values. The attGAN is trained to generate a modified image that represents the input image modified based on the attribute values. The generator encoder and the generator decoder form the generator model.

Figure 4:
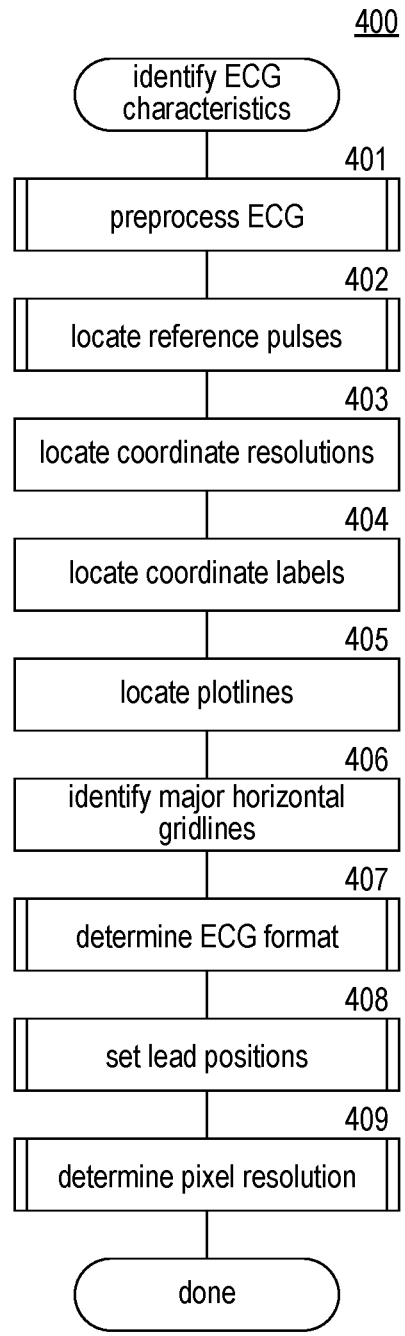
FIG. 4 is a flow diagram that illustrates the processing of an "identify ECG image characteristics" component in some aspects.

FIG. 4 is a flow diagram that illustrates the processing of an "identify ECG image characteristics" component in some aspects. The "identify ECG characteristics" component 400 identifies characteristics such as reference pulses, coordinate resolutions, location of plotlines, and so on. In block 401, the component invokes a "preprocess ECG image" component to, for example, determine the ECG image resolution and filter out the grid. In block 402, the component invokes a "locate reference pulses" component to locate the reference pulses of an ECG image. In block 403, the component invokes the "locate coordinate resolutions" component to determine whether the ECG image includes text indicating the resolution. In block 404, the component locates the coordinate labels. In block 405, the component locates plotlines of the ECG image. In block 406, the component identifies the major horizontal gridlines of the ECG image. The major horizontal gridlines may be used to determine a baseline pixel-row when there is no reference pulse before or after a plotline. In block 407, the component invokes the "determine ECG format" component to determine the format of the ECG image such as number of multi-lead plotlines. In block 408, the component sets the positions of the graphs such as baseline pixel-row and start and end pixel-column. In block 409, the component invokes a "determine pixel resolution" component to determine pixels per second and pixels per millivolt. The component then completes.

Figure 5:
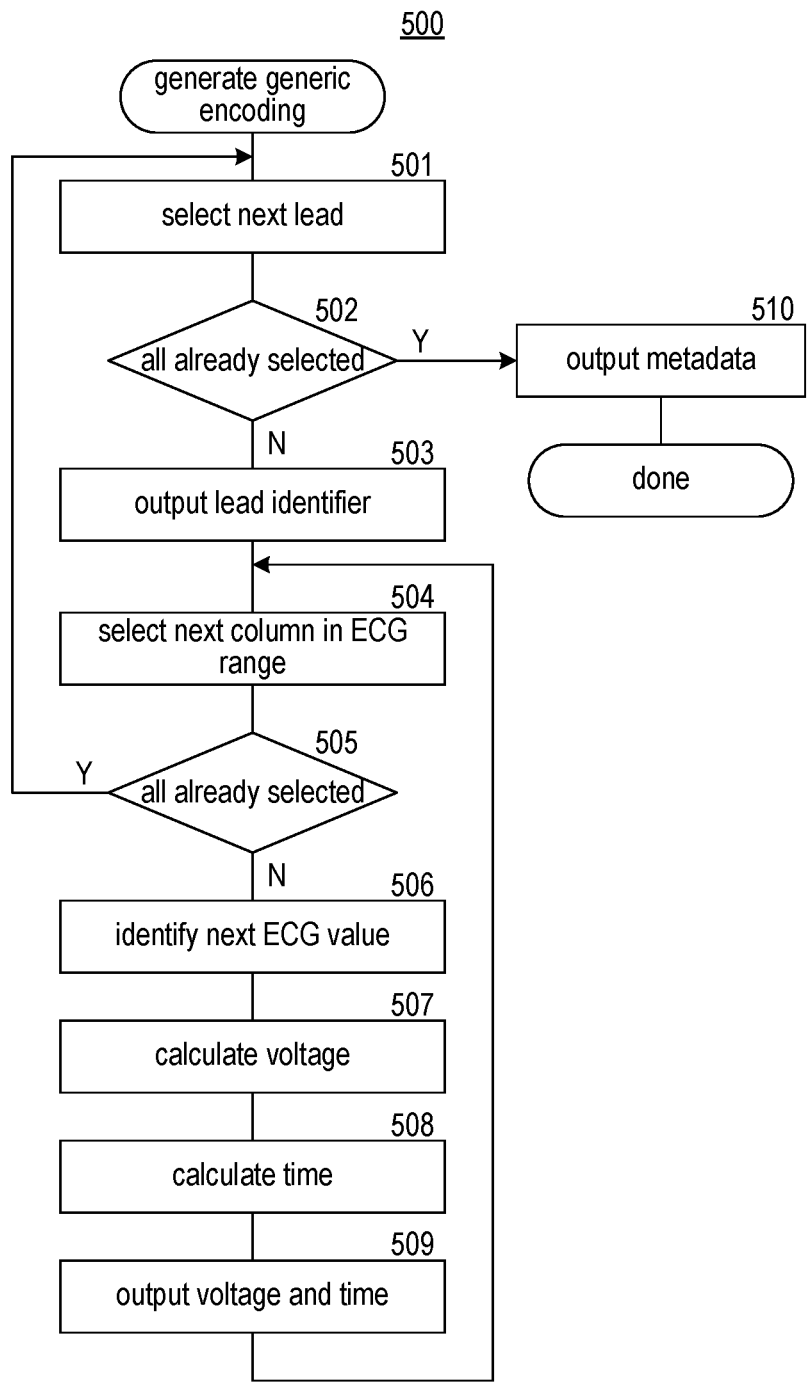
FIG. 5 is a flow diagram that illustrates processing of a "generate generic encoding" component of the ECG digitizing system in some aspects.

FIG. 5 is a flow diagram that illustrates processing of a "generate generic encoding" component of the ECG digitizing system in some aspects. The "generate generic encoding" component 500 generates a generic encoding of an ECG image that includes voltage and timing information along with metadata. In block 501, the component selects the next lead of the ECG image. In decision block 502, if all the leads have already been selected, then the component completes, else the component continues at block 503. In block 503, the component outputs a lead identifier which may have been identified using text recognition. In block 504, the component selects the next pixel-column of the graph for the lead. The graph starts with a start pixel-column and ends with an end pixel-column. The start pixel-column may be designated based on the position of a reference pulse, based on analyzing pixel-columns until a pixel-column is found that contains an ECG value such as an intensity indicative of a point on a graph, or based on the position of a vertical line that indicates the start of a graph. In decision block 505, if all the pixel-columns have already been selected, then the component loops to block 501 to select the next lead, else the component continues at block 506. In block 506, the component identifies a pixel-row with an ECG value consistent with being the next ECG value of the graph. In block 507, the component calculates the voltage for that ECG value based on that pixel-row minus the baseline pixel-row divided by pixels per millivolt. In block 508, the component calculates the time associated with the voltage. Alternatively, the time per pixel-column may be encoded in the metadata from which the time associated with each ECG value may be calculated. In block 509, the component outputs the voltage and time in the standard format and loops to block 504 to select the next pixel-column of the graph for the lead. In block 510, the component outputs metadata associated with the ECG image and completes.

Figure 6:
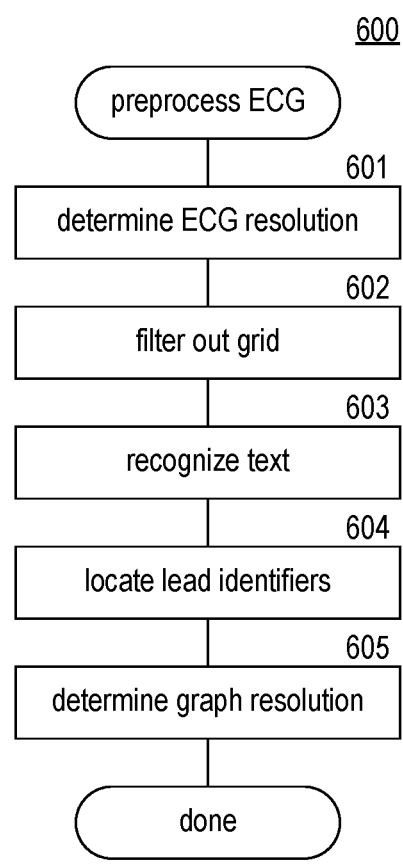
FIG. 6 is a flow diagram that illustrates the processing of a "preprocess ECG" component in some aspects.

FIG. 6 is a flow diagram that illustrates the processing of a "preprocess ECG" component in some aspects. The "preprocess ECG" component 600 is invoked to perform initial processing of an ECG image. In block 601, the component determines the resolution of the ECG image, such as the number of pixels horizontally and vertically. In block 602, the component filters out the grid. Various techniques may be used to filter out the grid such as setting pixel values (e.g., light shades of red) that do not represent ECG values or text to zero. The component may also filter out any background color of the ECG paper. In block 603, the component recognizes the text on the ECG image. In block 604, the component locates the lead identifiers from the text. In block 605, the component determines from the text (if the scales are recognized) the resolution of the graphs such as 25 millimeters per second and 10 millimeters per millivolt. The component then completes.

Figure 7:
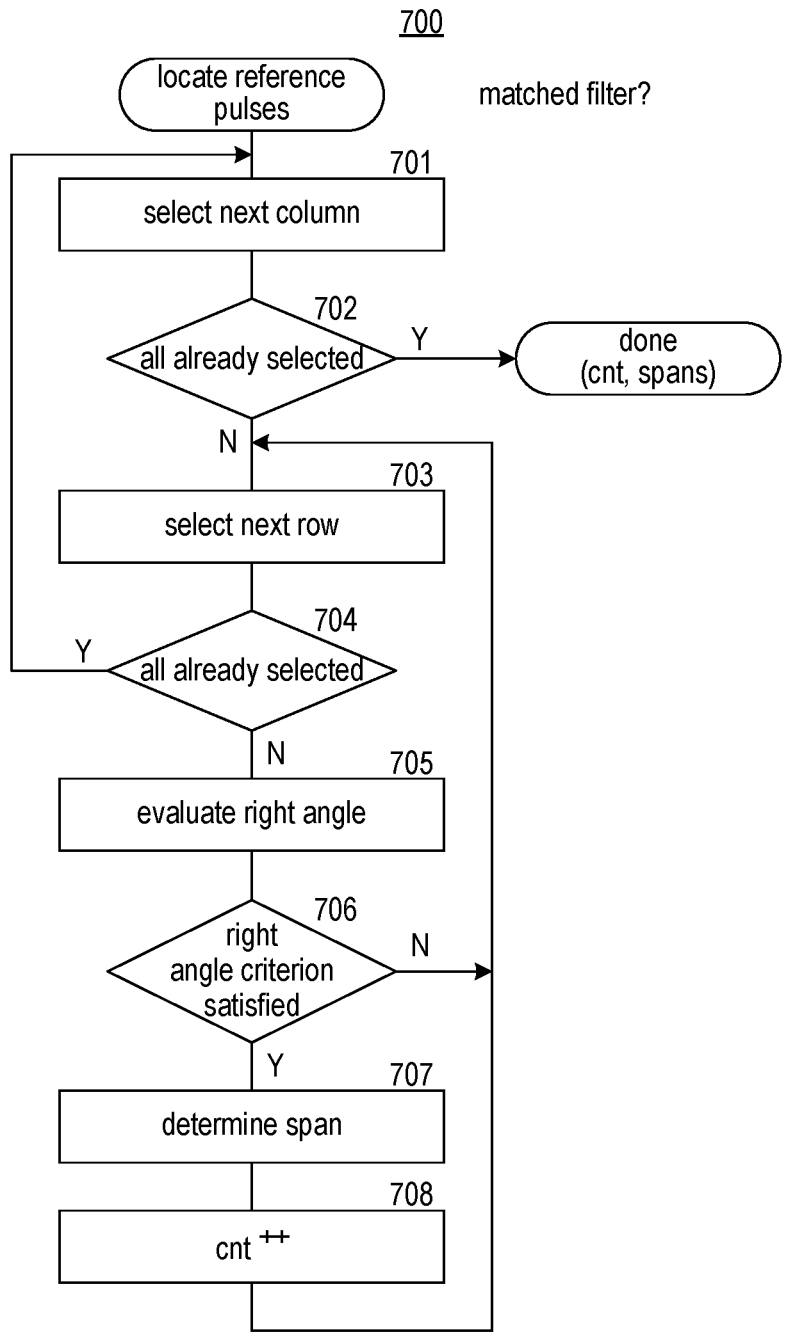
FIG. 7 is a flow diagram that illustrates the processing of a "locate reference pulses" component of the ECG digitizing system in some aspects.

FIG. 7 is a flow diagram that illustrates the processing of a "locate reference pulses" component of the ECG digitizing system in some aspects. The "locate reference pulses" component 700 is invoked to identify the reference pulses on an ECG image. In block 701, the component selects the next pixel-column. In decision block 702, if all the pixel-columns have already been selected, then the component completes indicating the count of and spans of the reference pulses, else the component continues at block 703. A span includes an origin (e.g., point of a right angle) along with number of pixel-columns in the horizontal direction and number of pixel-rows in the vertical direction. In block 703, the component selects the next pixel-row of the selected pixel-column. In decision block 704, if all such pixel-rows have already been selected, then the component loops to block 701 to select the next pixel-column, else the component continues at block 705. In block 705, the component evaluates whether the pixel-column and pixel-row represent the corner of a right angle. In decision block 706, if a right-angle criterion (e.g., minimum number of pixel-rows below and pixel-columns to the right of that pixel-column and pixel-row) is satisfied, then the component continues at block 707, else the component loops to block 703 to select the next pixel-row. In block 707, the component determines the span of the reference pulse—the number of pixel-rows and the number of pixel-columns. In block 708, the component increments the count of reference pulses and then loops to block 703 to select the next pixel-row.

Figure 8:
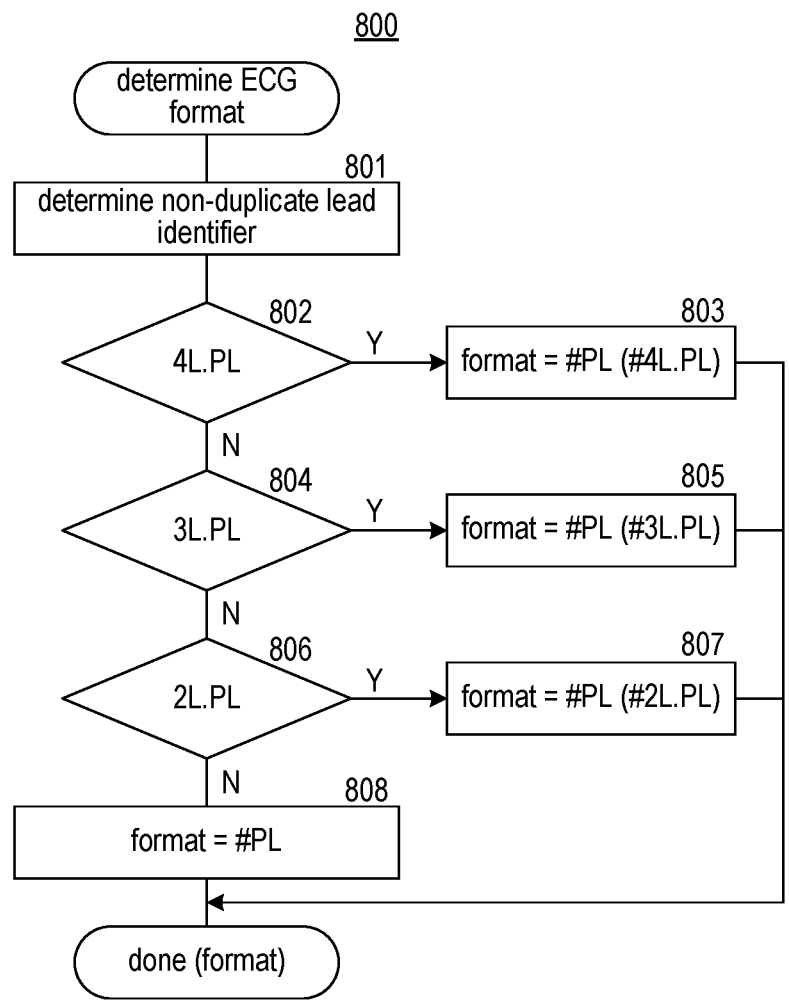
FIG. 8 is a flow diagram that illustrates processing of a "determine ECG image format" component of the ECG digitizing system in some aspects.

FIG. 8 is a flow diagram that illustrates processing of a "determine ECG image format" component of the ECG digitizing system in some aspects. The "determine ECG image format" component 800 determines the format of an ECG image such as number of plotlines and graphs. In block 801, the component determines the lead identifiers. The identifiers indicate the number of leads that are included in the ECG image. In decision block 802, if the ECG image includes four leads on a plotline, then the component continues at block 803, else the component continues at block 804. In block 803, the component sets the format to the number of plotlines (PL) and the number of plotlines that include four leads (4L.PL) and then completes. In decision block 804, if the ECG image includes three leads on a plotline, then the component continues at block 805, else the component continues at block 806. In block 805, the component sets the format to the number of plotlines and the number of plotlines that include three leads (3L.PL) and then completes. In decision block 806, if the ECG image includes two leads on a plotline, then the component continues at block 807, else the component continues at block 808. In block 807, the component sets the format to the number of plotlines and the number of plotlines that include two leads (2L.PL) and then completes. Although not illustrated, the format may also be set to the number of plotlines that include one lead. In block 808, the component sets the format to the number plotlines and then completes.

Figure 9:
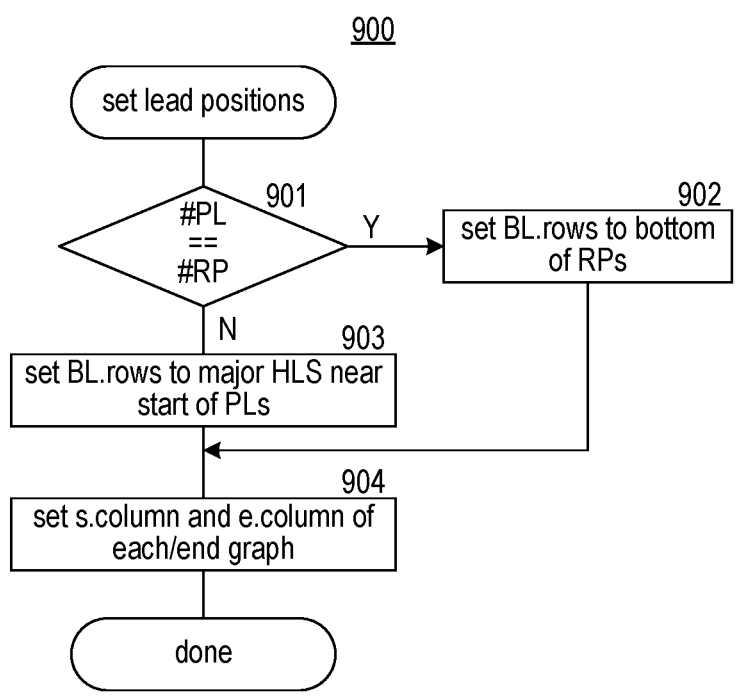
FIG. 9 is a flow diagram that illustrates the processing of a "set lead positions" component of the ECG digitizing system in some aspects.

FIG. 9 is a flow diagram that illustrates the processing of a "set lead positions" component of the ECG digitizing system in some aspects. The "set lead positions" component 900 is invoked to set a baseline pixel-row and start pixel-column and end pixel-column of the graph for each lead. In block 901, if the number of reference pulses (RP) and the number of plotlines is the same, then the component continues at block 902, else the component continues at block 903. In block 902, the component sets the baseline pixel-rows of each lead to the bottom of the reference pulse at the start or end of the plotline that contains the graph for that lead and then continues at block 904. In block 903, the component sets the baseline pixel-row to a major horizontal gridline near the start of each plotline. In block 904, the component sets the start pixel-column and end pixel-column for the graph of each lead and then completes. The start pixel-column and end pixel-column may be identified in various ways. For example, a gap in a plotline that is near a lead identifier may represent a start pixel-column. As another example, the start pixel-column may be identified based on the span of a plotline divided by the number of leads per plotline, such as when a plotline representing four leads spans 1024 pixels, the start pixel-columns may be at pixel 0, pixel 1024*(¼), pixel 1024*(²⁄₄), and pixel 1024*(¾).

The following paragraphs describe various embodiments of aspects of the ECG digitizing system and other systems. An implementation of the systems may employ any combination of the embodiments. The processing described below may be performed by a computing system with a processor that executes computer-executable instructions stored on a computer-readable storage medium that implements the system.

In some aspects, the techniques described herein relate to a method performed by one or more computing systems for generating an encoding of a lead of electrocardiogram (ECG) represented as an ECG image with pixels, the method including: identifying a reference pulse having a reference width pixel count, a reference height pixel count, a reference time, and a reference voltage; identifying a baseline pixel-row of a plotline of the ECG image that contains a graph of the lead; encoding per-pixel timing information based on the reference time and the reference width pixel count; for a plurality of pixel-columns, identifying a voltage pixel-row of that pixel-column that has an ECG value of the graph; and encoding a voltage based on distance between the baseline pixel-row and the voltage pixel-row and based on the reference voltage and the reference height pixel count; and outputting the encodings. In some aspects, the techniques described herein relate to a method further including recognizing text of the ECG image, identifying a lead identifier within the recognized text, and encoding the lead identifier. In some aspects, the techniques described herein relate to a method further including removing text from the ECG image prior to identifying the reference pulse. In some aspects, the techniques described herein relate to a method further including identifying the reference time from the recognized text. In some aspects, the techniques described herein relate to a method further including identifying the reference voltage from the recognized text. In some aspects, the techniques described herein relate to a method wherein the ECG image includes multiple leads and generating an encoding of time and voltages for each lead. In some aspects, the techniques described herein relate to a method wherein the encoding of the time and voltages are based on a standard encoding. In some aspects, the techniques described herein relate to a method wherein the baseline pixel-row is identified based on location of the reference pulse within the ECG image. In some aspects, the techniques described herein relate to a method wherein the encoding is based on a generic format and further including encoding the encoding into a standard. In some aspects, the techniques described herein relate to a method further including generating a derived ECG image from the encodings and assessing similarity of the derived ECG image to the ECG image. In some aspects, the techniques described herein relate to a method further including adjusting the encoding based on the assessment of similarity. In some aspects, the techniques described herein relate to a method wherein a plotline includes graphs that each represent a lead.

In some aspects, the techniques described herein relate to a method performed by one or more computing systems for generating an ECG encoding of a lead of electrocardiogram (ECG) represented as an ECG image, the method including: identifying a per-pixel time resolution and a per-pixel voltage resolution; identifying a start pixel-row and a start pixel-column of a plotline of the ECG image; identifying a baseline pixel-row of the plotline based on a closest pixel-row to a major horizontal gridline of a grid of the ECG image that is closest to the start pixel-row in the start pixel-column; encoding per-pixel timing information based on the per-pixel time resolution; for a plurality of pixel-columns, identifying a voltage pixel-row of that pixel-column that has an ECG value that is part of the plotline; and encoding a voltage based on distance between the baseline pixel-row and the voltage pixel-row and based on the per-pixel voltage resolution; and outputting the encoding of the per-pixel timing information and the encodings of the voltages as the ECG encoding. In some aspects, the techniques described herein relate to a method wherein the identifying of the per-pixel time resolution includes identifying a reference pulse, identifying a horizontal pixel-column span of the reference pulse, and setting the per-pixel time resolution based on the horizontal pixel-column span and a reference time span of the reference pulse. In some aspects, the techniques described herein relate to a method wherein the identifying of the per-pixel voltage resolution includes identifying a reference pulse, identifying a vertical pixel-row span of the reference pulse, and setting the per-pixel voltage resolution based on the vertical pixel-row span and a reference voltage span of the reference pulse. In some aspects, the techniques described herein relate to a method further including identifying a reference pulse of the ECG image based on two vertical lines connected by a horizontal line at an end of the line. In some aspects, the techniques described herein relate to a method further including identifying a reference pulse of the ECG image by applying a match filter having a shape of a reference pulse. In some aspects, the techniques described herein relate to a method further including determining accuracy of the ECG encoding by generating a derived ECG image from the ECG encoding and comparing the derived ECG image to the ECG image. In some aspects, the techniques described herein relate to a method further including recognizing text of the ECG image. In some aspects, the techniques described herein relate to a method further including identifying lead identifiers from the text. In some aspects, the techniques described herein relate to a method further including identifying a time resolution per distance and a voltage resolution per distance from the text. In some aspects, the techniques described herein relate to a method further including outputting a text encoding of the text as part of the ECG encoding.

In some aspects, the techniques described herein relate to one or more computing systems for generating a digitized encoding of a graph of an electrocardiogram (ECG) represented as an ECG image, the ECG image having pixels with pixel values, the one or more computing systems including: one or more computer-readable storage mediums storing computer-executable instructions for controlling the one or more computing systems to: identify a reference width pixel count, a reference height pixel count, a reference time, and a reference voltage; identify a baseline pixel-row of the graph; encode per-pixel timing information based on the reference time and the reference width pixel count; and for a plurality of pixel-columns of the graph, identify a voltage pixel-row of that pixel-column that has an ECG value of the graph; and encode a voltage based on distance between the baseline pixel-row and the voltage pixel-row and based on the reference voltage and the reference height pixel count; and one or more processors for executing the computer-executable instructions stored in the one or more computer-readable storage mediums. In some aspects, the techniques described herein relate to one or more computing systems wherein the ECG image does not include gridlines. In some aspects, the techniques described herein relate to one or more computing systems wherein the ECG image is encoded without reference to gridlines of the ECG image. In some aspects, the techniques described herein relate to one or more computing systems wherein the instructions further control the one or more computing systems to recognize text of the ECG image and encode at least some of the recognized text as metadata of the ECG encoding. In some aspects, the techniques described herein relate to one or more computing systems wherein per-pixel timing information is represented as a time associated with each encoded voltage.

In some aspects, the techniques described herein relate to a method performed by one or more computing systems for generating an encoding of a lead of electrocardiogram (ECG) represented as an ECG image, the method including: generating a filtered ECG image with a background grid of the ECG image removed; identifying from the filtered ECG image a start pixel-row and a start pixel-column of the lead; identifying from the filtered ECG image a per-pixel time resolution and a per-pixel voltage resolution; encoding per-pixel timing information based on per-pixel time resolution; for a plurality of pixel-columns, identifying from the filtered ECG image a voltage pixel-row of that pixel-column that has an ECG value and that is closest to a baseline pixel-row of the filtered ECG image; and encoding a voltage based on distance between the baseline pixel-row and the voltage pixel-row and based on the per-pixel voltage resolution and outputting the encodings.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims.

The invention claimed is:

1. A method performed by one or more computing systems for generating an encoding of a lead of electrocardiogram (ECG) represented as an ECG image with pixels, the method comprising:
   identifying a reference pulse having a reference width pixel count, a reference height pixel count, a reference time, and a reference voltage;
   identifying a baseline pixel-row of a plotline of the ECG image that contains a graph of the lead, the baseline pixel-row being identified as a pixel-row of a bottom of the reference pulse within the ECG image;
   encoding per-pixel timing information based on the reference time and the reference width pixel count;
   for a plurality of pixel-columns,
      identifying a voltage pixel-row of that pixel-column that has an ECG value of the graph; and
      encoding a voltage based on distance between the baseline pixel-row and the voltage pixel-row and based on the reference voltage and the reference height pixel count; and
   outputting the encodings.

2. The method of claim 1 further comprising recognizing text of the ECG image, identifying a lead identifier within the recognized text, and encoding the lead identifier.

3. The method of claim 2 further comprising removing text from the ECG image prior to identifying the reference pulse.

4. The method of claim 2 further comprising identifying the reference time from the recognized text.

5. The method of claim 2 further comprising identifying the reference voltage from the recognized text.

6. The method of claim 1 wherein the encoding of the time and voltages are based on a standard encoding.

7. The method of claim 1 wherein the encoding is based on a generic format and further comprising encoding the encoding into a standard.

8. The method of claim 1 further comprising generating a derived ECG image from the encodings and assessing similarity of the derived ECG image to the ECG image.

9. The method of claim 8 further comprising adjusting the encoding based on the assessment of similarity.

10. The method of claim 1 wherein a plotline includes graphs that each represents a lead.

11. One or more computing systems for generating a digitized encoding of graph of an electrocardiogram (ECG) represented as an ECG image, the ECG image having pixels with pixel values, the one or more computing systems comprising:
  one or more computer-readable storage mediums storing computer-executable instructions for controlling the one or more computing systems to:
    identify a reference pulse having a reference width pixel count, a reference height pixel count, a reference time, and a reference voltage;
    identify a baseline pixel-row of the graph as a pixel-row of a bottom of the reference pulse within the ECG image;
    encode per-pixel timing information based on the reference time and the reference width pixel count; and
    for a plurality of pixel-columns of the graph,
      identify a voltage pixel-row of that pixel-column that has an ECG value of the graph; and
      encode a voltage based on distance between the baseline pixel-row and the voltage pixel-row and based on the reference voltage and the reference height pixel count; and
  one or more processors for executing the computer-executable instructions stored in the one or more computer-readable storage mediums.

12. The one or more computing systems of claim 11 wherein the ECG image does not include gridlines.

13. The one or more computing systems of claim 11 wherein the ECG image is encoded without reference to gridlines of the ECG image.

14. The one or more computing systems of claim 11 wherein the instructions further control the one or more computing systems to recognize text of the ECG image and encode at least some of the recognized text as metadata of the ECG encoding.

15. The one or more computing systems of claim 11 wherein per-pixel timing information is represented as a time associated with each encoded voltage.

* * * * *